Patented July 23, 1935

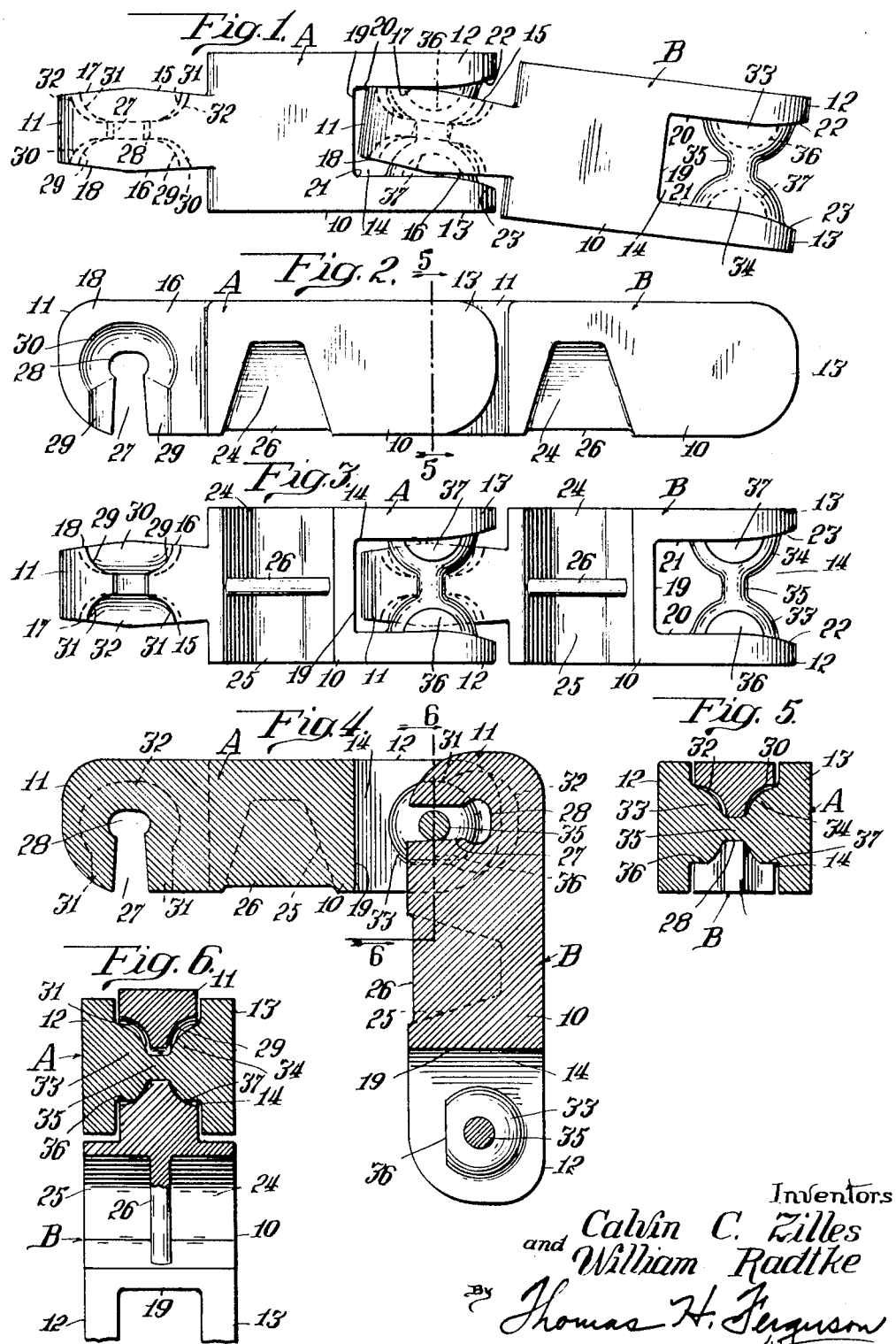

2,009,157

UNITED STATES PATENT OFFICE 2,009,157

CHAIN CONVEYER

Calvin C. Zilles, Oak Park, and William Radtke, Chicago, Ill., assignors to Mojonnier Bros. Co., a corporation of Illinois Application November 15, 1934, Serial No. 753,194

3 Claims. (Cl. 198—189)

The present invention relates to chain conveyers of the class wherein block-like links are joined end to end with loosely interfitting tongues and grooves. Such conveyers have a wide range of flexure in the plane of the tongues and grooves to suit them to travel about propelling and guiding sprocket wheels of relatively small diameter. They also have a limited range of flexure in a direction at right angles to said plane to suit them to travel over laterally curved guides.

As illustrative of the class of chain conveyers to which the present invention belongs, attention is directed to Mojonnier's United States Patent No. 1,804,701, granted May 12, 1931. The present conveyer may be considered an improvement upon the conveyer of that patent.

In conveyers of the class mentioned, it occurs in certain types of service that it is often necessary to replace a link in a busy conveyer. To make such change in conveyers of the patented type referred to, the allowed time must be sufficient to permit the withdrawal of the connecting pins and the replacing of the same after the new link is properly positioned. These operations often consume considerable time.

One object of the present invention is to provide a chain conveyer of the type mentioned wherein an injured or broken link may be removed and replaced by a good link with a great saving of time over that required for the prior patented link.

In every respect the new conveyer should be as efficient, durable and capable of varied operation as the aforesaid patented chain conveyer.

In carrying out the invention in its preferred form, we provide the tongue with a slot extending upward from the bottom of the tongue to approximately its center. The margin of this slot is provided with concavely curved surfaces located on both sides of the tongue. The upper portions of these concavely curved surfaces form central sockets on each side of the tongue. To cooperate with these sockets I provide two bulblike projections on the inner walls of the grooves of each link and connect these projections with a pin-like member or neck. The projections within the groove are convexly curved so as to provide ball surfaces which cooperate with the socket surfaces upon the tongue of the next link. When two links are being assembled, the neck between the balls passes upward through the slot in the tongue and when the final assembled position is reached the neck lies in the upper end of the slot and the ball surfaces are in position to cooperate with the socket surfaces. The parts have quite a loose fit, and when lateral flexure is given the conveyer, the ball and socket surfaces engage and take up the strain. In a straightaway pull, the slot wall engages the pin. In case of a pull sufficiently heavy to stretch the neck, or in the case of a wearing away of the neck due to long use, then, on a straightaway pull as well as on a pull around a lateral curve, the ball and socket surfaces will engage. The new structure provides for a wide flexure in the plane of the tongue and a limited flexure laterally in a direction at right angles to said plane.

The preferred embodiment of the invention is fully illustrated in the accompanying drawing and the same is clearly and fully described in the following detailed description. For a measure of the scope of the invention reference should be had to the appended claims.

In said drawing, Fig. 1 is a plan view of two links of a conveyer constructed and arranged in accordance with the present invention, the links being shown laterally flexed; Fig. 2 is a side elevation of the same links when both links are in longitudinal alinement; Fig. 3 is a plan view of the same links in alinement viewed from the under side; Fig. 4 is a central longitudinal section through the two links illustrating the two partially separated and at substantially right angles to each other, to show the manner of connecting the links together; Fig. 5 is a transverse section through the center of one of the necks together with the associated ball and socket surfaces, the plane of section being indicated by the line 5—5 of Fig. 2; and Fig. 6 is a section through the connecting neck and associated parts when the links are in the position indicated in Fig. 4, the plane of section being indicated by the line 6—6 of Fig. 4. Throughout these views like characters refer to like parts.

Although the links are identical, it may be well for convenience to refer to the link at the left in Fig. 1 as the forward link and the link at the right as the rear link, the former being designated A and the latter B. As before indicated each link comprises a block-like body 10, a forward central tongue or leaf 11, and rear tongues or leaves 12 and 13 which are spaced apart to provide a central slot 14. Thus, assembled links have interfitting tongues and grooves. As clearly shown, the tongue 11 has walls 15 and 16 which diverge and walls 17 and 18 which converge as one proceeds outward from the body 10. The inner portion of the groove 14 comprises an end wall 19 and adjacent side walls 21 which in plan meet at practically right angles to each other. Associated with the walls 20 and 21 are outwardly diverging walls 22, 23. It will be seen that when the parts are assembled these various tongue and groove walls will permit lateral flexure of the links with reference to each other. As the links are shown flexed in Fig. 1, the tongue wall 17 engages the groove wall 20 and the tongue wall 16 approaches the groove wall 23. In other words, the tongue and groove walls are shaped so as to permit of this lateral flexure. It may be remarked, however, that it is not necessary to have the particular tongue and groove walls herein disclosed in order to utilize invention. It will suffice if the tongue and groove walls permit the lateral flexure mentioned.

The body 10 of each link is provided with recesses 24, 25 which are separated by a partition 26. These recesses are for the purpose of receiving the sprockets of driving and guiding sprocket wheels. In the instance shown the two recesses 24 and 25 being in transverse alinement cooperate with a sprocket tooth of the split variety such as shown in United States Patent No. 998,054, granted July 18, 1911, to Vaughan.

As previously noted, the essence of the invention resides in a certain novel tongue and groove construction, which we may now consider. The tongue 11, has a transverse slot 27 which extends upwardly from its lower edge to about its center where it is slightly enlarged into an opening 28 of more or less elliptical contour. The margins or borders of the slot 27 and terminal opening 28 are cut away on both sides of the tongue so as to provide concavely curved border surfaces. The border surfaces on the opposite faces of the tongue are similar and each comprises linear portions which lie adjacent to the slot 27 and a peripheral portion that lies adjacent to the opening 28. Thus, the concave surfaces on one side of the tongue comprise the linear portions 29 and the circular portion 30. Similarly, on the opposite side of the tongue are the linear portions 31 and the peripheral portion 32. The concavely curved surfaces 30 and 31 constitute in effect sockets for ball and socket connections. The ball portions of these connections are formed in the groove 14 at the opposite end of the link as we shall now see.

As previously indicated, the inner walls of the spaced tongues 12 and 13 are provided with bulbular projections 33, 34 connected by an intervening neck 35. As clearly shown, the neck 35 is pin-like in formation and connects the two bulb-like projections 33, 34. The whole constitutes a bridge or bridging portion which spans the groove. The bulb-like bases or projections are convexly curved and each forms the ball member of the ball and socket joint formed between two connected links. The neck 35 is thin so as to pass freely up through the slot 27 into the opening 28 of the tongue of the adjacent link. When the parts are assembled, the convex surfaces 33, 34 lie within the concave sockets of the tongue and are adapted to cooperate with them. The relation of the ball members 33 and 34 to the socket surfaces 30, 31 is such, as before noted, that when the links are in longitudinal alinement, and not laterally flexed, the neck 35 will engage with the walls of the opening 28 and the ball surfaces 33, 34 will not engage the socket surfaces 30, 31, but these cooperating convex and concave surfaces will be adjacent to each other. It will be seen, however, that when the links are laterally flexed to the extent shown in Fig. 1, the ball and socket surfaces will engage each other. It will also be apparent that even though the pin-like neck 35 holds the ball and socket surfaces apart when a straightaway pull is applied to the conveyer, yet, if the neck should become displaced by reason of excessive pull, or should the neck become greatly worn, then the ball and socket surfaces would engage each other and prevent a rupture of the conveyer at that point. The construction described thus allows for vertical and lateral articulation to permit vertical and lateral curvature in travel.

In assembling the links, provision is made to permit of their assembly only when the links are positioned at substantially right angles to each other as shown in Fig. 4. An examination of the width of the ball-like members 33, 34 with reference to the space provided by the linear marginal concave surfaces 29, 31, will show that the ball surfaces cannot pass through these linear concave surfaces in the assembly of the parts unless the diameter be reduced. Accordingly, one side of each bulbular projection 33, 34 is cut away, as shown at 36 and 37. This reduction in the diameter of the ball members enables those members to pass within the space provided by the linear concave surfaces 29 and 31 until the neck 35 is brought into the opening 28, as will be apparent from an inspection of the parts shown in Fig. 4. When the neck 35 is once within the opening 28, then the sides of the socket space provided by the surfaces 30, 32 will permit a rotation of the links relative to each other into longitudinal alinement. When it becomes necessary to remove one of the links then that link must be moved with reference to the adjacent link into the relative positions shown in Fig. 4. Since a movement to this extent is required in order to bring the links into position for separation or assembly, it follows that the links themselves may have a considerable flexure in the plane of the tongue and groove, which is the vertical plane of the links. This flexure in a vertical plane is sufficient to meet all of the requirements in passing the conveyer around driving and guiding sprocket wheels. In other words, in practice the conveyer will never be required to travel so that its adjacent links will come into right angular positions relative to each other. The angular relation of two links in ordinary practice as they travel about sprocket wheels will be that of an obtuse angle and it will therefore be impossible to accidently separate the links by reason of their passing over driving or guiding sprocket wheels.

It will be noted that the neck 35 in association with the ball members 33, 34 forms a substantial tie between the groove forming tongues 12 and 13. Consequently the strength of the link is greater than if the neck 35 were omitted. It will also be noted that the distance between the forward wall of the opening 28 and the forward end of the tongue 11 is considerable. As a result of these features the conveyer is of ample strength to meet all of the requirements of service.

We claim:

1. A chain conveyer of the tongue and groove class comprising identical block-like links each with a tongue at one end and a groove at the other end and a sprocket recess on its under side for engaging with driving or guiding sprockets, a bridge spanning said groove, the tongue having a vertical slot for passing over the bridge of the next link, said bridge including convexly curved opposing portions joined by a narrow circular pin-like portion, said tongue slot being bounded by concave portions adapted to fit loosely upon said convexly curved portions, said latter portions being cut away to permit adjacent links to be assembled when the links are brought together while positioned at substantially a right angle to each other, and to prevent their separation when in normal pulling relation while allowing for lateral and vertical articulation to permit lateral and vertical curvature.

2. In a chain conveyer of the tongue and groove class, block-like links having interfitting tongues and grooves, the tongue of each link having a transverse vertical slot extending from its bottom to its center, and a concave border on all sides of said slot and on both sides of said tongue, the groove of each link having a bridging portion extending between the leaves on either side of the groove, said bridging portion including bulb-like bases integral with the leaves on either side of said groove and joined together by a relatively thin neck, said bulbous surfaces bearing against said concave border surfaces in certain relative positions of adjacent links, and said bases being cut away on one side to permit assembly of adjacent links when held in definite angular relation to each other.

3. In a chain conveyer of the tongue and groove class, block-like links having interfitting tongues and grooves, ball-like surfaces on opposing walls of each groove, a connecting neck uniting said surfaces, socket-like surfaces upon the outside of said tongue, the tongue having an upwardly extending slot for receiving said neck, said ball and socket surfaces loosely interfitting, and said surfaces being cut away on one side to permit assembly of said links at one angle and to lock them against separation when at other angles.

CALVIN C. ZILLES.
WILLIAM RADTKE.